(12) United States Patent
Jacobs et al.

(10) Patent No.: US 8,753,510 B2
(45) Date of Patent: Jun. 17, 2014

(54) FLUID FILTER

(75) Inventors: Richard Bradley Jacobs, Asbury Park, NJ (US); Mark Anthony Quintel, Kalamazoo, MI (US); Derek Ronald Thelen, Edison, NJ (US); Christopher Scott Rau, Battle Creek, MI (US); David Jay Taubenslag, Monmouth Junction, NJ (US)

(73) Assignee: Eaton Corporation, Cleveland, OH (US)

( * ) Notice: Subject to any disclaimer, the term of this patent is extended or adjusted under 35 U.S.C. 154(b) by 312 days.

(21) Appl. No.: 13/223,343

(22) Filed: Sep. 1, 2011

(65) Prior Publication Data
US 2013/0056406 A1 Mar. 7, 2013

(51) Int. Cl.
| | | |
|---|---|---|
| *B01D 29/11* | (2006.01) | |
| *B01D 29/27* | (2006.01) | |
| *B01D 29/50* | (2006.01) | |
| *B01D 29/00* | (2006.01) | |
| *B23P 11/00* | (2006.01) | |

(52) U.S. Cl.
USPC ........... 210/342; 210/315; 210/337; 210/338; 210/339; 210/452; 210/450; 29/428; 55/380; 55/482; 55/DIG. 26

(58) Field of Classification Search
USPC ......... 210/342, 315, 337, 338, 339, 287, 317, 210/452, 444, 450, 470, 474, 477; 29/428; 55/DIG. 26, 380, 482
See application file for complete search history.

(56) References Cited

U.S. PATENT DOCUMENTS

| | | | |
|---|---|---|---|
| 3,923,663 A | | 12/1975 | Reid |
| 3,931,015 A | | 1/1976 | Jenkins |
| 4,419,240 A | * | 12/1983 | Rosaen .................... 210/444 |
| 4,574,047 A | * | 3/1986 | Rosaen .................... 210/130 |
| 4,913,815 A | * | 4/1990 | Shulda .................... 210/287 |
| 5,624,559 A | * | 4/1997 | Levin et al. ............. 210/447 |

OTHER PUBLICATIONS

Blaine R. Copenheaver, "PCT International Search Report", date mailed Oct. 23, 2012, date completed Oct. 11, 2012, 2 pages, PCT, ISA/US, Commissioner for Patents, Alexandria, VA 22313-1450 USA.

* cited by examiner

*Primary Examiner* — Nam Nguyen
*Assistant Examiner* — Madeline Gonzalez
(74) *Attorney, Agent, or Firm* — Fay Sharpe LLP

(57) ABSTRACT

A fluid pressure vessel has a chamber with an inlet and outlet with a nested primary and secondary filter bag disposed such that the primary bag communicates exclusively with the inlet, and flow through the primary bag flows through the secondary bag before the outlet. The primary bag is disposed in a first rigid porous basket and the bag rim seals against a flange on the first basket. The secondary filter bag surrounds the first basket and the rim of the secondary bag is sealed around the flange of first basket. A second rigid porous basket surrounds the secondary filter bag and is sealed on the rim of the secondary filter bag and is sealed against the inner periphery of the pressure chamber by an O-ring.

5 Claims, 2 Drawing Sheets

FLUID FILTER

BACKGROUND

The present disclosure relates to fluid filters of the type employed in pressurized fluid systems and particularly where pressurized fluid is circulated in a closed system, such as, for example, hydraulic fluid systems employed for operating hydraulic actuators and systems employing fresh water pumped under pressure. Typically, filters for pressurized fluid systems employ a vessel with a pressure chamber having an inlet and an outlet and filtering material disposed in the chamber so as to filter all of the fluid as it passes between the inlet and the outlet. It is common place to have the vessel with a removable lid on the pressure chamber so as to permit access to the filtering material for removal and replacement.

Heretofore, fluid filters of the above described type have employed granulated filtering material and filter bags for filtering of the fluid within the pressure chamber. However, eventually the filtering material becomes coated or clogged with foreign matter and flow through the system is diminished. It then becomes necessary to frequently replace the filtering material in order to continue the system in operating service. This has been particularly the case where a filter bag has been employed to provide a high degree of filtration of very fine particles of foreign matter inasmuch as the rapid buildup of particles on the surface of the filter bag has readily resulted in clogging and reduction of flow through the filter and required frequent replacement of the bag resulting in frequent and costly down time for the system. Thus, it has been desired to find a way or means of providing a high degree of filtration in the fluid system with a filter bag and yet to increase the service life of the filter bag in the pressure chamber.

SUMMARY

The present disclosure describes a filter vessel having a pressure chamber with an inlet and an outlet with a pair of filter bags disposed fluidically in series therein for filtering flow of fluid between the inlet and the outlet. The pressure chamber has a generally cylindrical configuration with an annular sealing surface formed about the inner periphery of the chamber between the inlet and the outlet. A primary filter bag is disposed within a rigid porous container or basket having an open end and the open end of the bag is sealed at its rim about the rim of the porous container. A secondary filter bag is disposed about the first porous container and is disposed in a second porous container or basket and the secondary filter bag is sealed about the open end rim of the second porous container. The open end of the rim of the second porous container is sealed about a sealing surface formed on the inner surface of the pressure chamber. The primary filter bag and first porous container or basket are disposed within the secondary filter bag; and, the rim of the first porous container is sealed about the open end of the secondary filter bag with the primary and secondary bags fluidically in series such that all flow entering the inlet flows through the primary filter bag and subsequently through the secondary filter bag before entering the outlet of the pressure chamber. In the illustrated version, the first and second porous container or basket are formed of rigid corrosion resistant material such as stainless sheet material. The primary and secondary bag's rims are arranged such that the differential pressure of the flow through the bags provides a positive sealing force of the rims of the bags and porous containers for sealing thereabout. The second porous container is sealed about the inner periphery of the pressure chamber with a resilient annular seal such as an O-ring.

DETAILED DESCRIPTION

Figure 1:
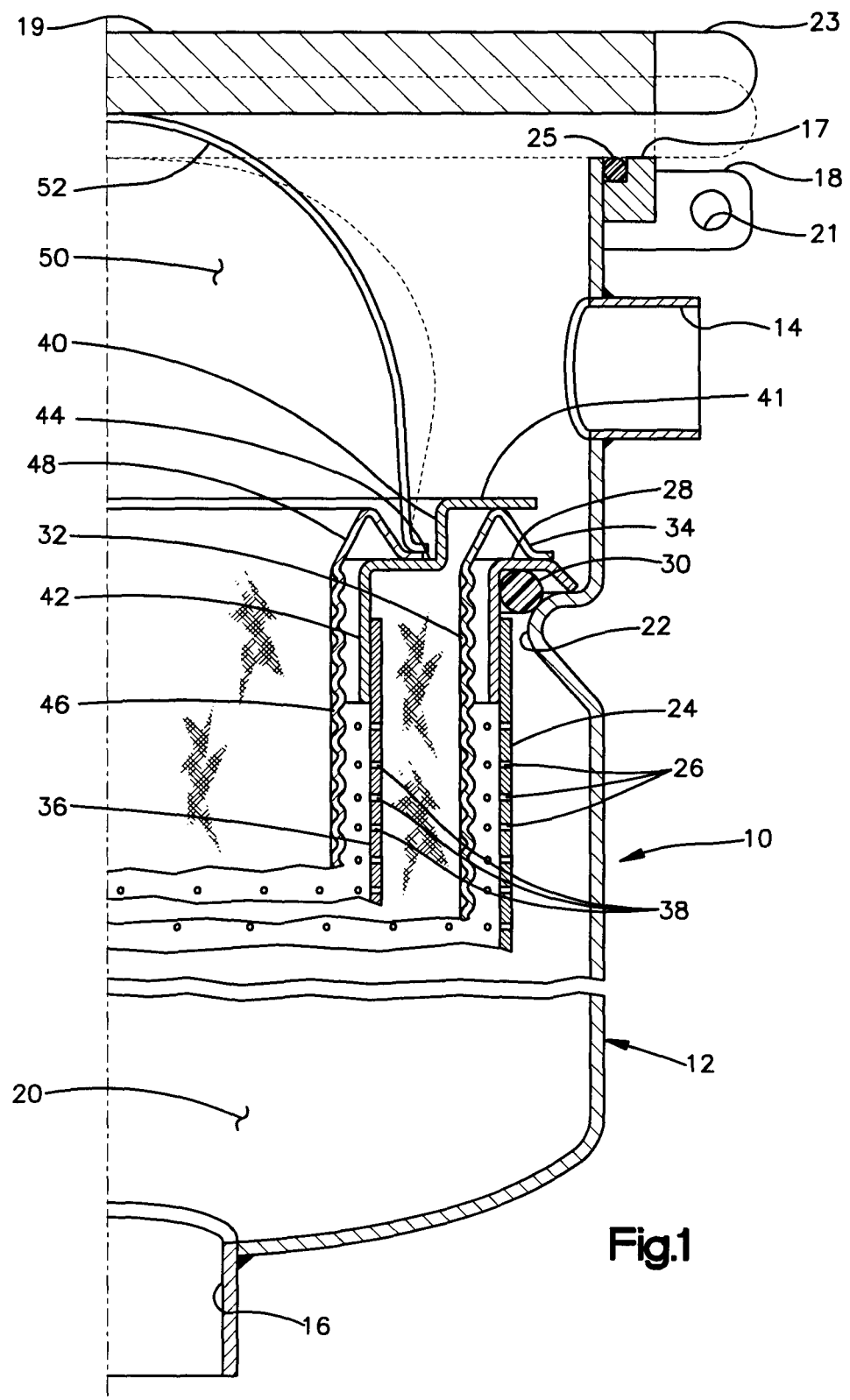
FIG. 1 is a half cross-section of the assembled filter of the present disclosure; and, FIG. 2 is an exploded view of the filter of FIG. 1.

Referring to the drawings, a filtering system in accordance with the present disclosure is indicated generally at 10 and includes a pressure vessel illustrated in an exemplary version in a generally hollow cylindrical configuration with an inlet passage 14 provided adjacent the upper end thereof and an outlet passage 16 provided remotely at the closed lower end of the pressure vessel 12. As shown in FIG. 2, the upper open end of the pressure vessel 12 is provided with an annular ring 17, which ring is provided with a plurality of lugs 18 adapted for attachment of a removable lid 19 shown in the open position in solid outline in FIG. 1 and in dashed line in the closed position. It will be understood that the lid may be attached by any suitable expedient as, for example, swing bolts (not shown) pinned through apertures 21 in lugs 18 and engaging lugs 23 on lid 19 in a manner well known in the art. Ring 17 has an annular groove 15 formed therein for receiving an annular seal ring 25 for sealing the lid on vessel 12 and forming the upper wall of pressure chamber 20.

Figure 2:
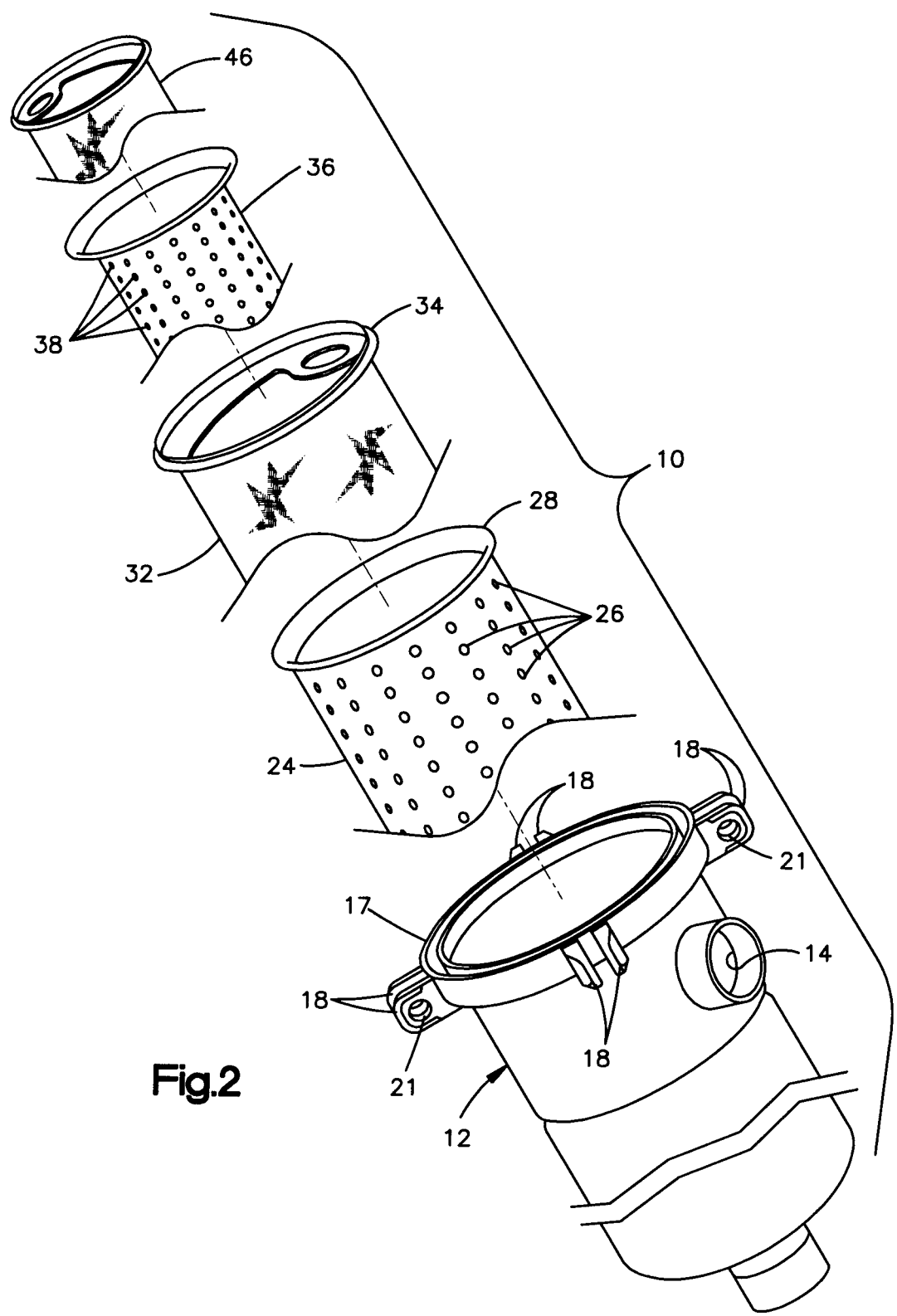

The inner periphery of the pressure vessel defines a fluid pressure chamber 20 which has provided on the wall thereof between the inlet 14 and outlet 16 an annular sealing surface 22 which may be formed by an integrally formed rib in the wall of the pressure vessel 12 as illustrated in FIG. 1.

An outer rigid porous container or basket 24 has a plurality of spaced apertures or perforations 26 provided therein and has a generally cylindrical configuration with the lower end closed and the upper open end provided with a radially outwardly extending annular flange 28. In the present practice, the flange 28 is formed separately and attached to the basket 24 by any suitable expedient as, for example, weldment; and, the basket and flange 28 may be formed of any suitable corrosion resistant material such as stainless steel. The flange 28 of the outer basket 24 is sealed about the annular sealing surface 22 by a suitable annular resilient seal such as O-ring 30.

An outer filter bag 32 is disposed within the outer basket 24, the bag 32 having a generally rigid rim 34 attached to the upper end thereof. In the present practice, the annular rim 34 has in cross-section an inverted V configuration so as to provide some degree of resiliency or deflectability and rests upon the upper surface of the flange 28 of the basket. In the present practice it has been found satisfactory to form the bag rim 34 of plastic material attached to the bag for example by ultrasonic weldment.

An inner rigid porous container or basket 36 is provided with a plurality of perforations or apertures 28 for permitting flow therethrough and has the unshown lower end thereof closed with the open upper end thereof provided with a rigid annular flanged ring 40 which has a cylindrical portion 42 attached to the upper end of basket 36. Ring 40 has an outwardly extending flange portion 41 seated upon the upper surface of the rim 34 of the outer basket. The ring 40 has a generally stepped configuration in cross-section with an intermediate shoulder 44 formed thereon between the cylindrical portion 42 and the radially outwardly extending portion 41. The inner basket 36 may also be formed of corrosion resistant material such as stainless steel.

An inner filter bag 46 is provided at its open end with a generally rigid annular rim member 48 which has a generally inverted V configuration in cross-section with the outer edge thereof registered against the shoulder 44 of the flange of inner basket 46.

In the present practice in one version it has been found satisfactory to form the rim member 48 of plastic material attached to the bag for example by ultrasonic weldment.

In the present practice it has been found satisfactory to provide a hold down, such as, for example, a U-shaped spring 52 with end of the legs registered on the rim 48 of inner filter bag 46 and the opposite closed end registered against the underside of lid 23 for exerting a downward force on the bag and basket rims to effect sealing. In operation, the fluid flowing through the bag causes a pressure differential across the inner bag 46 and provides forces acting downwardly upon the bag and assisting in maintaining a seal between the annular flange 48 and the shoulder 44 and adds to the forces of the hold down spring 52 in effecting seating of flange 40 against the rim flange 34 of outer bag 32 and the flange 28 of the outer basket against seal 30, thereby facilitating the seal of the inner and outer bags against the inner and outer basket rims and against the sealing surface of the pressure vessel. This arrangement thus provides a plenum chamber 50 between the open ends of the bags and provides exclusive communication to the open end of the primary filter bag 46 and the fluid inlet 14.

The present disclosure thus provides a fluid filter having a pressure chamber with an inlet and an outlet and primary and secondary filter bags disposed fluidically in series therein, each bag retained by a rigid porous basket with the bags disposed concentrically so that the rim of the inner bag is sealed against the rim of the outer bag in a manner providing a plenum space between the inlet and the filter bags. The arrangement results in a filter system in which all flow on the inlet passes initially through the inner filter bag and subsequently through the outer filter bag before passing to the outlet. The pressure differential of the flow through the bags is utilized to provide forces to maintain the rims of the bags and baskets sealed about the inner periphery of the chamber.

The pressure vessel is adapted for having a removable lid to facilitate removal and replacement of the filter bags. In this regard, the inner and outer bag and basket members are arranged so that they may be lifted out upon removal of the lid.

An exemplary version has been described with reference to the drawings. Obviously, modifications and alterations will occur to others upon reading and understanding the preceding detailed description. It is intended that the exemplary embodiment or the equivalents thereof be construed as including all such modifications and alterations insofar as they come within the scope of the appended claims.

The invention claimed is:

1. A fluid filtering apparatus comprising:
   (a) a vessel having a generally cylindrical wall configuration with an annular sealing surface formed about the cylindrical wall defining a fluid pressure chamber having an inlet and outlet;
   (b) a primary filter bag disposed in the pressure chamber and having an open end thereof disposed for communicating exclusively with the inlet;
   (c) a first rigid porous container disposed about the primary filter bag, wherein all flow through the primary filter bag flows through the first rigid porous container;
   (d) a secondary filter bag disposed about said first rigid porous container and having an open end thereof sealed about the first rigid porous container such that all flow exiting the primary filter bag flows through the secondary filter bag before entering the outlet; and,
   (e) a second rigid porous container disposed about the secondary filter bag, wherein all flow through the secondary filter bag flows through the second rigid porous container, wherein an open end of the second rigid porous container is sealed about the annular sealing surface and the open end of the primary filter bag is sealed about an open end of the first rigid porous container, and wherein the first rigid porous container has an open end sealed about the open end of the secondary filter bag.

2. The filtering apparatus defined in claim 1, wherein the first and second rigid porous containers are formed of perforated metal sheet.

3. The apparatus of claim 1, wherein the pressure chamber has a generally cylindrical configuration with an open end adapted for closure with a lid.

4. A method of making a fluid filtering apparatus comprising:
   (a) providing a pressure vessel having a generally cylindrical wall configuration and forming an annular sealing surface about the cylindrical wall and forming therein a pressure chamber with a fluid inlet and outlet;
   (b) disposing a primary filter bag in the pressure chamber and disposing an open end of the primary filter bag for communicating exclusively with the inlet;
   (c) disposing a first rigid porous container about the primary filter bag such that all fluid flowing through the primary filter bag is caused to flow through the first rigid porous container;
   (d) disposing a secondary filter bag about the first rigid porous container such that all fluid flow through the primary filter bag is caused to flow through the secondary filter bag;
   (e) disposing a second rigid porous container about the secondary filter bag such that all fluid flow through the secondary filter bag is caused to flow through the second rigid porous container;
   (f) sealing an open end of the second rigid porous container about the annular sealing surface; and,
   (g) sealing the open end of the primary filter bag about an open end of the first rigid porous container and sealing the open end of the first rigid porous container about an open end of the secondary filter bag.

5. The method of claim 4, wherein the sealing of the open end of the second rigid porous container about the annular sealing surface includes sealing with an O-ring.

* * * * *